United States Patent [19]

Wolf

[11] Patent Number: 4,725,409

[45] Date of Patent: Feb. 16, 1988

[54] ARRANGEMENT FOR FINE DUST SEPARATION IN A FLUIDIZED BED REACTOR

[75] Inventor: Josef Wolf, Julich, Fed. Rep. of Germany

[73] Assignee: Kernforschungsanlage Julich Gesellschaft mit beschrankter Haftung, Julich, Fed. Rep. of Germany

[21] Appl. No.: 788,696

[22] Filed: Oct. 21, 1985

Related U.S. Application Data

[63] Continuation of Ser. No. 556,017, Nov. 29, 1983, abandoned.

[30] Foreign Application Priority Data

Dec. 3, 1982 [DE] Fed. Rep. of Germany ....... 3244769

[51] Int. Cl.⁴ ................................................ B01J 8/18
[52] U.S. Cl. ..................................... 422/145; 422/147; 55/427; 55/431; 55/459 R; 55/468; 55/466; 55/459.1
[58] Field of Search ............. 422/147, 145; 55/261, 55/426, 427, 431, 459 R, 466, 468; 110/216, 245

[56] References Cited

U.S. PATENT DOCUMENTS

| | | | |
|---|---|---|---|
| 1,463,416 | 7/1923 | Adams | 55/468 |
| 1,570,040 | 1/1926 | Chandler | 55/431 |
| 2,414,641 | 1/1947 | French | 55/426 |
| 2,653,801 | 9/1953 | Fontein et al. | 209/144 |
| 2,759,511 | 8/1956 | Jacobson | 209/144 |
| 2,848,381 | 8/1958 | Nicholson | 55/459 R |
| 2,958,420 | 11/1960 | Hurley | 209/211 |
| 3,034,647 | 5/1962 | Giesse | 209/144 |
| 3,136,705 | 6/1964 | Sommers | 422/147 |
| 3,337,050 | 8/1967 | Labecki | 209/211 |
| 3,546,891 | 12/1970 | Fekete | 55/459 D |
| 3,764,005 | 10/1973 | Zemanek | 209/211 |
| 3,764,006 | 10/1973 | Wikdahl | 209/211 |
| 3,893,914 | 7/1975 | Bobo | 209/144 |
| 4,092,130 | 5/1978 | Wikdahl | 55/459 R |
| 4,235,828 | 11/1980 | Howes | 123/585 |
| 4,251,484 | 2/1981 | Daviduk et al. | 422/147 |
| 4,259,911 | 4/1981 | Jones | 110/245 |
| 4,279,622 | 7/1981 | Jones et al. | 48/206 |
| 4,311,670 | 1/1982 | Nieminen et al. | 422/146 |
| 4,394,349 | 7/1983 | Catmell | 422/147 |
| 4,474,119 | 10/1984 | Jones | 110/245 |

FOREIGN PATENT DOCUMENTS

| | | |
|---|---|---|
| 2403378 | 4/1979 | France . |
| 66243 | 4/1969 | German Democratic Rep. .... 55/468 |
| 48008 | 8/1980 | Japan ................... 422/147 |
| 104586 | 1/1980 | Poland . |
| 700511 | 12/1953 | United Kingdom ................. 55/431 |
| 1291343 | 10/1972 | United Kingdom . |
| 159711 | 11/1963 | U.S.S.R. ............................. 209/211 |

OTHER PUBLICATIONS

Chemical Abstracts, vol. 93 (1980).

*Primary Examiner*—David L. Lacey
*Attorney, Agent, or Firm*—Scully, Scott Murphy & Presser

[57] ABSTRACT

An arrangement for fine dust separation in a fluidized bed reactor with a cyclone and dust return conduit. A venturi tube extends from the solids discharge of the cyclone intermediate the cyclone and the dust return conduit, and a gas injector is located at the inlet of the venturi tube. The fine dust which leaves the fluidized bed is separated from the exhaust gas in the cyclone, and the separated dust is conducted from the cyclone, through the venturi tube and the dust return conduit, and into the lower region of the fluidized bed. Gas is conducted through the gas injector to help force the separated dust through the return conduit and into the fluidized bed.

16 Claims, 5 Drawing Figures

ARRANGEMENT FOR FINE DUST SEPARATION IN A FLUIDIZED BED REACTOR

This application is a continuation of prior application Ser. No. 556,017, filed Nov. 29, 1983, and now abandoned.

BACKGROUND OF THE INVENTION

1. Field of the Invention

The present invention relates to a fluidized bed reactor including a cyclone for fine dust separation, and a dust conveying conduit to return the dust to the fluidized bed.

During operation of a fluidized bed having changing particle sizes, and especially during fluidized bed combustion, for instance, of graphite, fine material is carried out of the fluidized bed together with the exhaust gas, and the fine material must be separated from the exhaust gas and returned into the fluidized bed or further conducted elsewhere (for example, bunkered). It is difficult to separate the fine material or dust from the exhaust gas when the fine dust possesses poor flow properties.

2. Discussion of the Prior Art

As has been known for a considerable period of time, the separation of the fine dust material from the exhaust gas and the return of the fine dust into the fluidized bed during a graphite combustion could not be achieved by means of a system located within the fluidized bed reactor and consisting of a cyclone with an attached dust return conduit extending to the lower region of the fluidized bed layer. In contrast therewith, for a long period external separator systems have been employed in which the dust is recycled into the fluidized bed either with the aid of a gate valve or an injection system positioned downstream thereof.

Disadvantages of these systems reside in the large demand for mechanically articulated components, the cooling of the dust material prior to re-entry into the fluidized bed and, above all, the flow and blockage problems encountered in the bunker and the material return system.

SUMMARY OF THE INVENTION

Accordingly, it is an object of the present invention to improve upon the state of the technology with the aid of a system for separating dust from exhaust gas from a fluidized bed which, without necessitating any extensive technical demands, facilitates producing a surprisingly troublefree recycling of the separated dust into the fluidized bed, and which can be incorporated without difficulty into the fluidized bed reactor.

The system of the above-mentioned type distinguishes itself from other systems for separating and recycling dust from a fluidized bed through a venturi tube, which forms an extension of the solids discharge of the cyclone, between the cyclone and the dust return conduit, and a gas injector at the inlet of the venturi tube.

In this arrangement, the fine dust which leaves the fluidized bed is separated from the exhaust gas by means of a cyclone whose dust outlet, in a deviation from the usual arrangement, is not closed, but instead is extended by a venturi tube. There is additionally provided a gas injector means at the inlet to the venturi tube, which is used to blow the material, separated from the exhaust gas in the cyclone, into the lower region of the fluidized bed.

In this way, the gas injector means serves as a gate valve between the pressure level in the cyclone and the pressure level in the material return conduit, and also propels the driving jet of the poorly flowable fine dust through the venturi tube and the material return conduit. Accordingly, the operation of the cyclone can be either actuated or terminated by switching on and off the driving jet through the venturi tube. The cyclone may have a discharge cone leading to the dust outlet of the cyclone; and preferably an annular gap is provided at an inlet of the discharge cone, and a supplemental gas is conducted through that inlet, and along the wall of the cone, to prevent any caking of dust on that wall. This arrangement is especially helpful to conduct or discharge from the cyclone dusts that have extremely poor flow characteristics.

BRIEF DESCRIPTION OF THE DRAWINGS

Reference may now be had to the following detailed description of the construction and manner of operation of the inventive arrangement, taken in conjunction with the accompanying drawings, representing a fluidized bed reactor for graphite combustion; in which.

DETAILED DESCRIPTION

Figure 1:
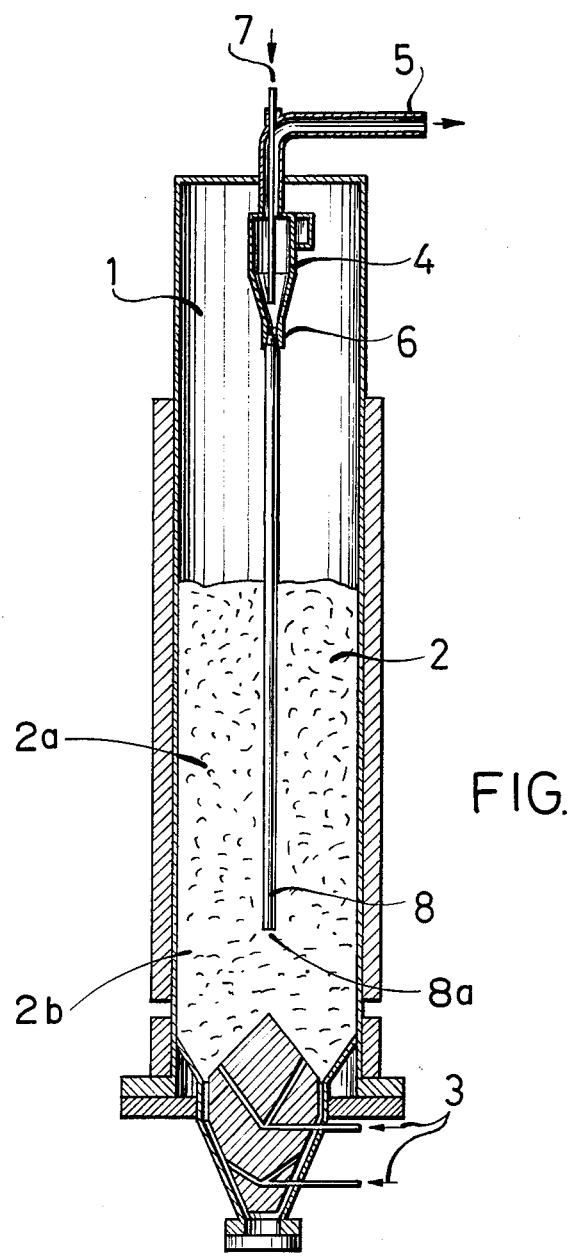
FIG. 1 schematically illustrates a fluidized bed reactor with a cyclone incorporated therein pursuant to the invention.

As illustrated in FIG. 1, fluidized bed reactor 1 includes a fluidized bed layer 2 having upper and lower halves 2a and 2b, and which is maintained in a suspended state by means of a fluidizing medium 3. At the upper end of the fluidized bed reactor, exhaust gas from bed 2, together with entrained fine granular material, is tangentially conveyed into the cyclone 4, which separates the granular material from the exhaust gas. The gas which has been cleansed of the granular material exits the installation through 5; and the separated fine granular material is propelled by the injector 7 and is conducted through the venturi tube 6 and material return conduit 8, and thus reconveyed into the fluidized bed layer, specifically, into lower half 2b thereof. Material return conduit 8 extends into, and has a bottom outlet 8a located in, the lower half 2b of fluidized bed 2.

In this way, the gas injection means 7 effectively develops and maintains at the inlet of the venturi constriction 6, a fluid pressure greater than the fluid pressure at the outlet end of the material return conduit 8. This, first, assists conducting the separated granular material from cyclone 4, through venturi constriction 6 and the material return conduit 8, and into lower half 2b of fluidized bed layer 2, and second, prevents gases from passing upward through material return conduit 8 and into cyclone 4 from lower half 2b of the fluidized bed layer 2.

Figure 2:
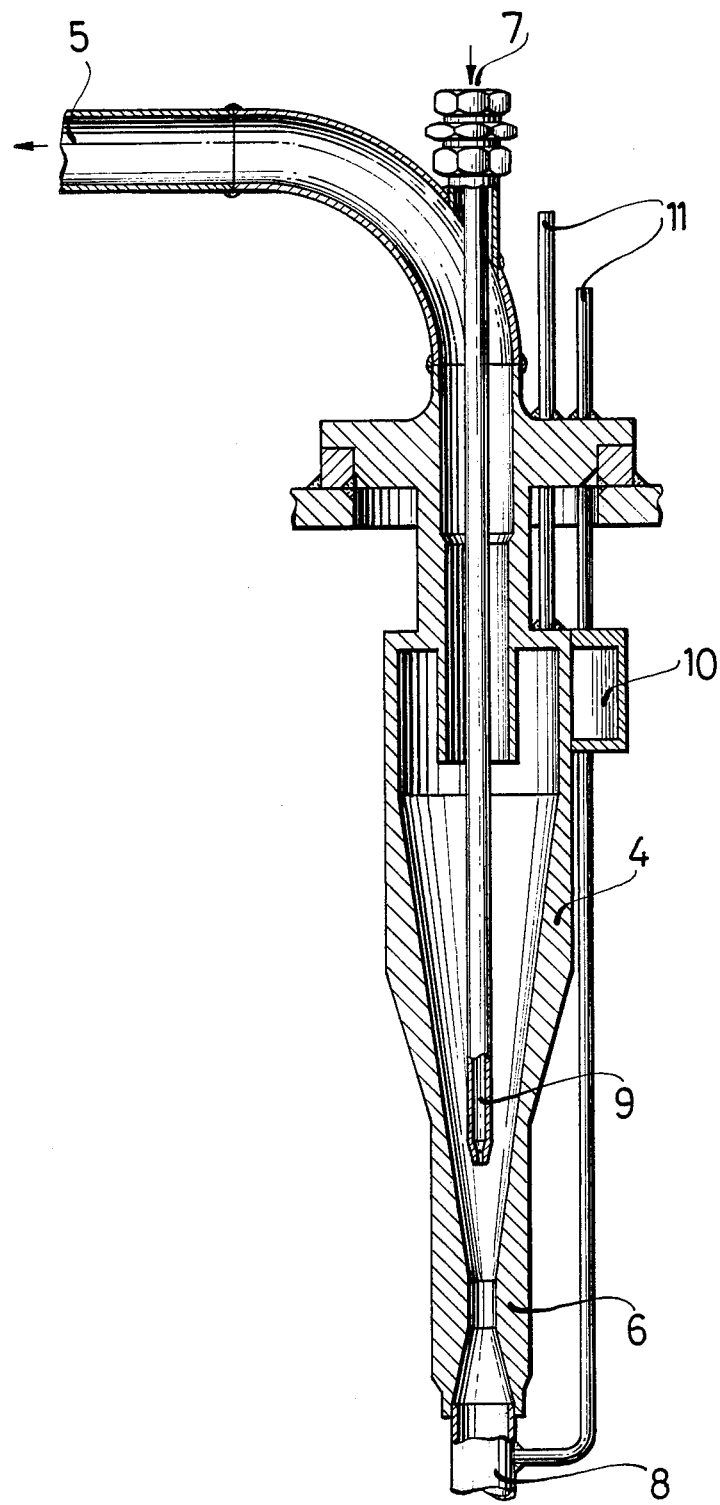
FIG. 2 illustrates, on an enlarged scale, the cyclone as shown in FIG. 1.

The cyclone, the attached venturi tube 6 and the conveying conduit 8 are illustrated in more detail in FIG. 2 of the drawings. As can be ascertained, the lower end of the cyclone forms an uninterrupted transition into the venturi tube 6, and the nozzle 9 of the injector 7 is arranged at the inlet of the venturi tube. Through the aid of injector 7, the separated fine granular material is conducted into the conveying conduit 8. The exhaust gas enters the cyclone through the inlet opening 10, and the cleansed gas is discharged from the installation through outlet 5. Finally, operation of the above-arrangement may be monitored by measuring a pressure difference by means of tube 11.

An embodiment of the invention which has been investigated on a laboratory pilot scale, and which is of the type schematically illustrated in FIGS. 1 and 2, has the following measurements: The cyclone has an internal diameter of 65 mm, and is extended by a venturi tube having a diameter of 8 mm at its narrowest width, to which there is connected a conveying tube with a diameter of 20 mm. The nozzle opening has a diameter of 1.5 mm and is arranged at a distance of 25 mm from the narrowest cross section of the venturi tube.

Through this pilot arrangement, the fine dust quantity which was discharged from the furnace was reduced, with the aid of the invention, from about 5 kg/hr to less than 200 g/hr, even though the gas velocity in the fluidized bed was increased by means of the blown-in drive gas. In essence, the exhaust gas quantity consisted of a total of about 20 $Nm^3/h$, and the gas quantity for the drive jet consisted of about 1.2 $Nm^3/h$, and the measured pressure difference between tube 11 was 20 mbar.

Figure 5:
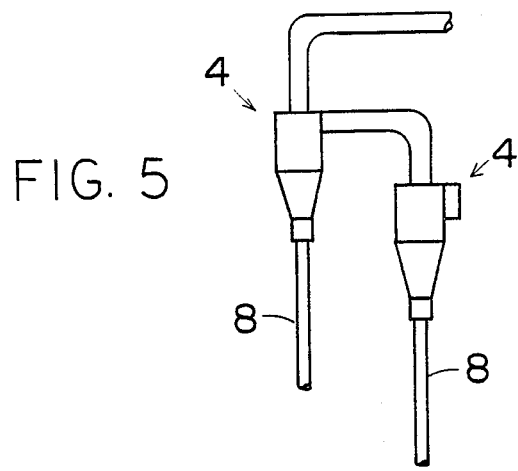
FIG. 5 shows a pair of cyclones serially connected together.

A still further improvement could be obtained by employing a multi-stage cyclone system, as shown in FIG. 5.

Figure 4:
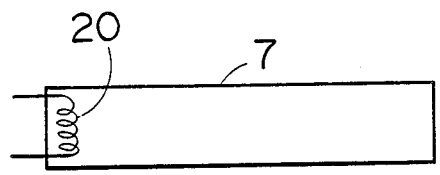
FIG. 4 shows a heat loop in an inlet of a gas injector used with the cyclone.

The gas feed to the injector 7 was conducted through the furnace itself for a suitable tempering. As shown in FIG. 4, a heat loop 20 may be arranged in the inlet to the gas injector 7 to provide for temperature control.

Figure 3:
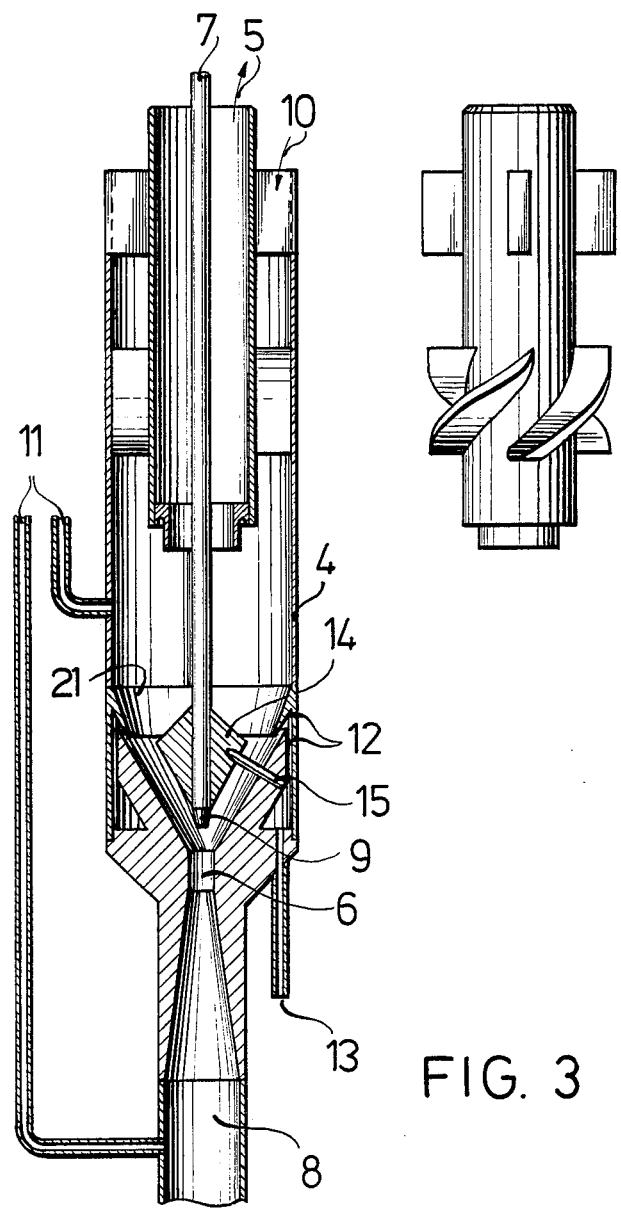
FIG. 3 illustrates a cyclone with an annular gap at the inlet of a discharge cone of the cyclone.

FIG. 3 illustrates an annular gap 12 located at the end of the cyclone and which extends around the outside of a conical surface of a discharge cone of the cyclone. To assist the discharge of dusts having poor flow characteristics from the cyclone, gas can be introduced through the annular gap 12 so that the conical surface at the cyclone discharge is constantly traversed by a gas flow which prevents the adherence of dust particles to the conical surface.

The components shown in FIG. 3 which correspond to those of the arrangement of FIG. 2 are identified by the same reference numerals. However, at the inlet to the discharge cone of the cyclone there is additionally provided the annular gap 12, which is supplied with supplemental gas through an inlet connection 13. An annular lip 21 is located adjacent the outlet of annular gap 12 to direct gas therefrom against the inside surface of the discharge cone. A guide cone 14 is located at the end of the nozzle 9 to smooth the flow of the dust grains into the discharge cone, and the guide cone is shaped to conform with the flow behavior of the dust through the cyclone in this discharge region. Centering pins 15 provide for a precise orientation of the guide cone 14 and of the nozzle 9.

In the illustrated arrangement, the cyclone has an internal diameter of 80 mm. The diameter at the narrowest location 6 of the venturi tube has a dimension of 8 mm, and the nozzle 9 has a diameter of 2.2 mm. The diameter of the immersion or material return tube 8 is 32 mm, and that of the gas exhaust conduit 5 is 45 mm. The gas is exhausted at a rate of 40 $Nm^3/hr$ and gas is introduced through the drive gas conduit 7 at 2.2 $Nm^3/hr$. The annular gap 12 has an inner width of 0.15 mm and was supplied with supplemental gas at a rate of 1 $Nm^3/hr$.

By means of the inventive system, which includes the venturi tube at the cyclone discharge and an injector nozzle 9 connected ahead or upstream thereof, there is achieved a reentrainment of even poorly flowing dust into a fluidized bed under differential pressures of up to 1500 to 2000 mbar. A drive gas flow through injector 7 of from about 5% of the gas throughput of the cyclone, is adequate.

In addition, the quantity of gas introduced into the cyclone via the annular gap is from about 2.5% of the gas throughput of the cyclone.

Advantages of the systems are elimination of mechanically movable components, as well as any cooling of the fine dust, and any danger of blockage in the material return conduit. Furthermore, the amount of dust that would have to be handled outside the fluidized bed reactor can be reduced considerably.

Quite understandably, the inventive dust separating and return arrangement does not have to be located inside the fluidized bed reactor, and depending upon need, can also be arranged outside the fluidized bed reactor. Moreover, it may also be advantageous to provide for additional processing of the separated granular material, or means to conduct that material into a bunker.

What is claimed is:

1. A fluidized bed reactor comprising:
a body holding a bed layer including upper and lower halves and means for introducing a fluidizing medium to fluidize the bed layer;
a cyclone for separating granular material from a gas, and including an inlet in communication with the fluidized bed layer for receiving gas and entrained granular material therefrom, a gas outlet for discharging separated gas, and a solids outlet for discharging separated granular material;
a material return conduit in communication with the solids outlet of the cyclone and extending into, and having a bottom outlet in, the lower half of the fluidized bed layer for conducting separated granular material from the cyclone, into the lower half of the fluidized bed layer;
a venturi constriction connected to and located between the cyclone and the material return conduit, and having an inlet in fluid communication with the solids outlet of the cyclone, and an outlet in fluid communication with the material return conduit to conduct granular material from the cyclone and into the material return conduit; and
gas injection means connected to and extending into the cyclone and having a discharge opening located above the venturi constriction for directing a gas stream through a lower portion of the cyclone and into the venturi constriction to develop and maintain at the inlet of the venturi constriction, a fluid pressure greater than the fluid pressure at the bottom outlet of the material return conduit to assist conducting the separated granular material from the cyclone, through the venturi constriction and the material return conduit, and into the lower half of the fluidized bed layer, and to prevent gases from passing upward through the material return conduit and into the cyclone from the lower half of the fluidized bed layer.

2. A fluidized bed reactor according to claim 1 wherein the cyclone further includes:

a discharge cone located above and in fluid communication with the venturi constriction, and including an inside surface sloping downwardly inwardly to the inlet of the venturi constriction;

means defining an annular gap extending around the discharge cone, the annular gap having an inlet in fluid communication with the fluidized bed layer for receiving gas therefrom, and an outlet positioned and arranged for conducting gas into the cyclone; and means for directing gas from the outlet of the annular gap against the inside surface of the discharge cone.

3. A fluidized bed reactor according to claim 2 wherein the cyclone is incorporated within the body of the fluidized bed reactor.

4. A fluidized bed reactor according to claim 2, wherein the gas injection means includes an inlet for receiving and conducting a gas into the gas injection means, and the reactor further includes a heat loop arranged in the inlet of the gas injection means to heat the gas conducted thereinto.

5. A fluidized bed reactor according to claim 1 further comprising another cyclone, the two cyclones being connected together in series.

6. A fluidized bed reactor according to claim 1 wherein:

the venturi constriction includes;
(i) a throat portion,
(ii) an upper surface portion converging downwardly inwardly to the throat portion, and
(iii) a lower surface portion diverging downwardly outwardly from the throat portion; and
the discharge opening of the gas injection means terminates above the upper surface portion of the venturi constriction.

7. A fluidized bed reactor according to claim 6 wherein:

the cyclone defines a central axis and includes a lower surface portion converging downwardly inwardly to the upper surface portion of the venturi constriction; and
the lower surface portion of the cyclone and the upper surface portion of the venturi constriction converge inwardly at fixed and equal angles to said axis.

8. A fluidized bed reactor according to claim 7 wherein the venturi constriction and the gas injection means are adapted to maintain a pressure difference of at least 1500 mbar between the fluidized bed layer and the cyclone.

9. A fluidized bed reactor comprising:

a body holding a bed layer including upper and lower halves and means for introducing a fluidizing medium to fluidize the bed layer;

a cyclone for separating granular material from a gas, and including an inlet in communication with the fluidized bed layer for receiving gas and entrained granular material therefrom, a gas outlet for discharging separated gas, and a solids outlet for discharging separated granular material;

a material return conduit in communication with the solids outlet of the cyclone and extending into, and having a bottom outlet in, the lower half of the fluidized bed layer for conducting separated granular material from the cyclone, into the lower half of the fluidized bed layer;

a venturi constriction connected to and located between the cyclone and the material return conduit, and having an inlet in fluid communication with the solids outlet of the cyclone and an outlet in fluid communication with the material return conduit to conduct granular material from the cyclone and into the material return conduit;

gas injection means connected to and extending into the cyclone and having a discharge opening located above the venturi constriction for directing a gas stream through a lower portion of the cyclone and into the venturi constriction to develop and maintain at the inlet of the venturi constriction, a fluid pressure greater than the fluid pressure at the bottom outlet of the material return conduit to assist conducting the separated granular material from the cyclone, through the venturi constriction and the material return conduit, and into the lower half of the fluidized bed layer, and to prevent gases from passing upward through the material return conduit and into the cyclone from the lower half of the fluidized bed layer;

the cyclone further including
(i) a first downwardly inwardly extending conical surface located inside the cyclone, above the venturi constriction, and forming a solids discharge flow path leading to the solids outlet of the cyclone,
(ii) an annular gap extending outside and around the conical surface, the annular gap having an outlet in fluid communication with the solids discharge flow path,
(iii) a supplement gas inlet in fluid communication with the fluidized bed layer and the annular gap for conducting gas thereinto from the fluidized bed layer, and
(iv) an annular lip extending downwardly inwardly from a side of the cyclone, above the annular gap, to direct gas therefrom against the conical surface of the cyclone.

10. A fluidized bed reactor according to claim 9, wherein the conical surface also defines the solids outlet of the cyclone.

11. A fluidized bed reactor according to claim 10 wherein:

the venturi constriction includes a second downwardly inwardly extending conical surface defining the inlet of the venturi constriction.

12. A fluidized bed reactor according to claim 9, wherein the cyclone further comprises:

a guide cone supported above the solids outlet, and including a second downwardly inwardly extending conical surface, located inside, spaced from and concentric with the first conical surface to smooth the flow of granular material past the first conical surface and through the solids outlet; and a plurality of centering pins extending between the first conical surface and the guide cone, and holding the guide cone centered in the cyclone.

13. A fluidized bed reactor according to claim 12, wherein the gas injection means extends through the guide cone.

14. A fluidized bed reactor for graphite combustion comprising:

a body holding a bed layer having upper and lower halves including fine dust graphite material and means for introducing a fluidizing medium to fluidize the bed layer;

a cyclone for separating granular material from a gas, and including an inlet in communication with the fluidized bed layer for receiving gas and fine dust graphite material entrained therewith from the fluidized bed layer, a gas outlet for discharging separated gas, and a solids outlet for discharging separated fine dust graphite material;

a material return conduit in communication with the solids outlet of the cyclone and extending into, and having a bottom outlet in, the lower half of the fluidized bed layer for conducting graphite material from the cyclone and into the lower half of the fluidized bed layer;

a venturi constriction connected to and located between the cyclone and the material return conduit, and having an inlet in fluid communication with the solids outlet of the cyclone and an outlet in fluid communication with the material return conduit to conduct a granular material from the cyclone and into the material return conduit; and gas injection means connected to and extending into the cyclone and having a discharge opening located above the venturi constriction for directing a gas stream through a lower portion of the cyclone and into the venturi constriction to develop and maintain at the inlet of the venturi constriction, a fluid pressure greater than the fluid pressure at the bottom outlet of the material return conduit to assist conducting the separated granular material from the cyclone, through the venturi constriction and the material return conduit, and into the lower half of the fluidized bed layer, and to prevent gases from passing upward through the material return conduit and into the cyclone from the lower half of the fluidized bed layer.

15. A fluidized bed reactor according to claim 14 wherein:

the venturi constriction includes a throat portion, and an upper surface portion converging downwardly inwardly to the throat portion;

the cyclone defines a central axis and includes a lower surface portion converging downwardly inwardly to the upper portion of the venturi constriction; and the lower surface portion of the cyclone and the upper surface portion of the venturi constriction converge inwardly at fixed and equal angles to said axis.

16. A fluidized bed reactor according to claim 15 wherein the venturi constriction and the gas injection means are constructed so as to maintain a pressure difference of at least 1500 mbar between the fluidized bed layer and the cyclone.

* * * * *